(12) United States Patent
David (10) Patent No.: US 11,319,113 B2
(45) Date of Patent: May 3, 2022

(54) SELF-WEIGHING EXPANDABLE BAG (71) Applicant: Liviu David, Buchare (RO)

(72) Inventor: Liviu David, Buchare (RO)

( * ) Notice: Subject to any disclaimer, the term of this patent is extended or adjusted under 35 U.S.C. 154(b) by 408 days.

(21) Appl. No.: 16/552,247

(22) Filed: Aug. 27, 2019

(65) Prior Publication Data

US 2021/0061519 A1 Mar. 4, 2021

(51) Int. Cl.
| | | |
|---|---|---|
| B65D 33/00 | (2006.01) |
| G01G 19/52 | (2006.01) |
| A45C 3/00 | (2006.01) |
| A45C 3/04 | (2006.01) |
| A45C 3/06 | (2006.01) |
| B65D 33/04 | (2006.01) |
| B65D 33/10 | (2006.01) |

(52) U.S. Cl.
CPC ............ *B65D 33/004* (2013.01); *A45C 3/001* (2013.01); *A45C 3/04* (2013.01); *A45C 3/06* (2013.01); *B65D 33/04* (2013.01); *B65D 33/105* (2013.01)

(58) Field of Classification Search
CPC .. B65D 33/004; B65D 33/04; A45C 2200/05; A45C 7/0063; A45C 7/0072; A45C 13/02; A45C 2013/025; A45C 2013/026; B65F 2210/144; B65F 2210/1446; B65F 2210/184; G01G 3/02; G01G 3/04; G01G 3/06; G01G 19/52; G01G 19/58; G01G 19/60
USPC ........ 383/2, 4, 105, 106, 109, 118; 177/149, 177/131, 202, 225, 173, 232, 264, 245, 177/233; 150/113, 116
See application file for complete search history.

(56) References Cited

U.S. PATENT DOCUMENTS

| | | | | |
|---|---|---|---|---|
| 255,132 | A | * | 3/1882 | Jacob ................... G01G 19/56 |
| | | | | 177/149 |
| 3,229,741 | A | | 1/1966 | Ambrose |
| 5,416,279 | A | | 5/1995 | Tseng |
| 8,485,329 | B1 | | 7/2013 | Roy et al. |

(Continued)

FOREIGN PATENT DOCUMENTS

| | | |
|---|---|---|
| CN | 201700621 A | 1/2011 |
| CN | 202127965 A | 2/2021 |
| WO | 2008057020 A1 | 5/2008 |

OTHER PUBLICATIONS

European Patent Office, International Search Report and Written Opinion dated Oct. 21, 2020 for PCT International Application No. PCT/EP2020/065745, international filing date Jun. 5, 2020, priority date Aug. 27, 2019.

(Continued)

*Primary Examiner* — Jes F Pascua
*Assistant Examiner* — Nina K Attel
(74) *Attorney, Agent, or Firm* — Law Office of Andrei D Popvici, PC (57) ABSTRACT

A self-weighing expandable bag includes an inner receptacle that can slide vertically within an outer sleeve under the weight of bag contents. One or more springs, which may include coils and/or elastic fabric, connect the inner receptacle to the outer sleeve. One or more bag handles are attached to the sleeve. As the weight of the contents of the receptacle increases, the receptacle slides down within the sleeve and increasingly protrudes under the sleeve, expanding the vertical extent of the bag and revealing graphical markings underneath the sleeve and/or within a window defined in the sleeve.

19 Claims, 9 Drawing Sheets

(56) References Cited

U.S. PATENT DOCUMENTS

| | | | |
|---|---|---|---|
| 8,716,610 | B2 | 5/2014 | Zyman Beer et al. |
| 8,944,249 | B1 * | 2/2015 | Mullaney ............. G01G 23/206 |
| | | | 206/459.1 |
| 2007/0029218 | A1 | 2/2007 | Picot et al. |
| 2007/0056779 | A1 | 3/2007 | Laniado et al. |

OTHER PUBLICATIONS

Trunkster, "Trunkster", downloaded from https://indiegogo.com/projects/trunkster-www-trunkster-co#/, Jun. 2017.
Bluesmart One, "Bluesmart One—Smart Luggage: GPS, Remote Locking, Battery Charger (International Carry-on Size, TSA-Approved)", downloaded from https://www.amazon.com/Bluesmart-One-International-Carry-TSA-Approved/dp/B00X5OUC1U, Jun. 2017.
Australian Patent Office, Examination Report No. 1 dated Oct. 25, 2021 for Australian patent application No. 2021200460, priority date Aug. 27, 2019.

* cited by examiner

SELF-WEIGHING EXPANDABLE BAG

BACKGROUND

The invention relates to bags sized to be carried by humans, such as shopping bags.

Bag design takes into account both aesthetics and functionality, and various bag designs have been used for shopping, fashion, school, business use, or general-purpose carriage of items.

Some bag designs have incorporated a weighing device and/or markings in the bag itself in order to address problems posed by overly-heavy bags. For example, in U.S. Pat. No. 5,416,279, Tseng describes a receptacle weight indicator in which force-releasable elements are used in association with imprinted numeral values of weight to provide a visual indication of the weight of the contents of a receptacle. The weight indicator facilitates the allocation of expenses of garbage removal by weight. In U.S. Pat. No. 8,485,329, Roy et al. describe a luggage bag having a handle incorporating a scale for weighing the bag. The device allows airline passengers to reduce fees for excess baggage weights. In U.S. Pat. No. 8,716,610, Zyman Beer et al. describe an elastic handle integrated luggage scale. The scale allows addressing individual's concerns about the weight of the objects they are carrying, for example due to weight restrictions enforced at an airport. In US Patent Application Publication No. 2007/0056779, Laniado et al. describe a backpack having shoulder strap assemblies including weight-measuring devices. The device addresses the health problems that may be caused by overloaded backpacks, especially in children.

SUMMARY

According to one aspect, a bag sized to be carried by human comprises a receptacle configured to contain a load for transportation and a sleeve comprising a handle, the sleeve at least partially laterally enclosing the receptacle so that the receptacle slides vertically inside of and with respect to the sleeve. The bag further comprises at least one spring attached to the sleeve and configured to support the receptacle, the spring controlling a distance by which the receptacle descends within the sleeve under a weight of the load, wherein an extent to which the receptacle descends within the sleeve when the bag is held by the handle is visually indicative of the weight of the load. The spring may include one or more coils and/or elastic fabric extending under the receptacle.

BRIEF DESCRIPTION OF THE DRAWINGS

The foregoing aspects and advantages of the present invention will become better understood upon reading the following detailed description and upon reference to the drawings where:

FIG. 1-A shows isometric and side views of a self-weighing expandable bag including coil springs in a retracted (default, unloaded) configuration according to some embodiments of the present invention.

FIG. 1-B shows isometric and side views of the bag of FIG. 1-A in an expanded (loaded, weighed-down) configuration according to some embodiments of the present invention.

FIG. 2-A shows isometric and side views of a self-weighing expandable bag including an elastic fabric spring in a retracted (default, unloaded) configuration according to some embodiments of the present invention.

FIG. 2-B shows isometric and side views of the bag of FIG. 2-A in an expanded (loaded, weighed-down) configuration according to some embodiments of the present invention.

FIG. 3-A shows isometric and side views of a self-weighing expandable bag including top and bottom elastic fabric springs in a retracted (default, unloaded) configuration according to some embodiments of the present invention.

FIG. 3-B shows isometric and side views of the bag of FIG. 3-A in an expanded (loaded, weighed-down) configuration according to some embodiments of the present invention.

FIG. 4-A shows a side view of a bag including exemplary numerical markings on the side of the inner receptacle, revealed as the extent of the receptacle outside of the sleeve increases under the weight of receptacle contents according to some embodiments of the present invention.

FIG. 4-B shows a side view of a bag including exemplary numerical markings on the side of the inner receptacle, whose alignment to a reference sleeve marking changes under the weight of receptacle contents according to some embodiments of the present invention.

FIG. 5-A shows a side view of a bag including an exemplary sleeve having a display notch defined along a bottom edge of the sleeve to highlight a selected marking along the inner receptacle according to some embodiments of the present invention.

FIG. 5-B shows a side view of a bag including an exemplary sleeve having a display window positioned to highlight a selected marking along the inner receptacle according to some embodiments of the present invention.

DETAILED DESCRIPTION OF PREFERRED EMBODIMENTS

In the following description, it is understood that all recited connections between structures can be direct connections or indirect connections through intermediary structures. A set of elements includes one or more elements. Any recitation of an element is understood to refer to at least one element. A plurality of elements includes at least two elements. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself.

The following description illustrates embodiments of the invention by way of example and not necessarily by way of limitation.

Figure 1:
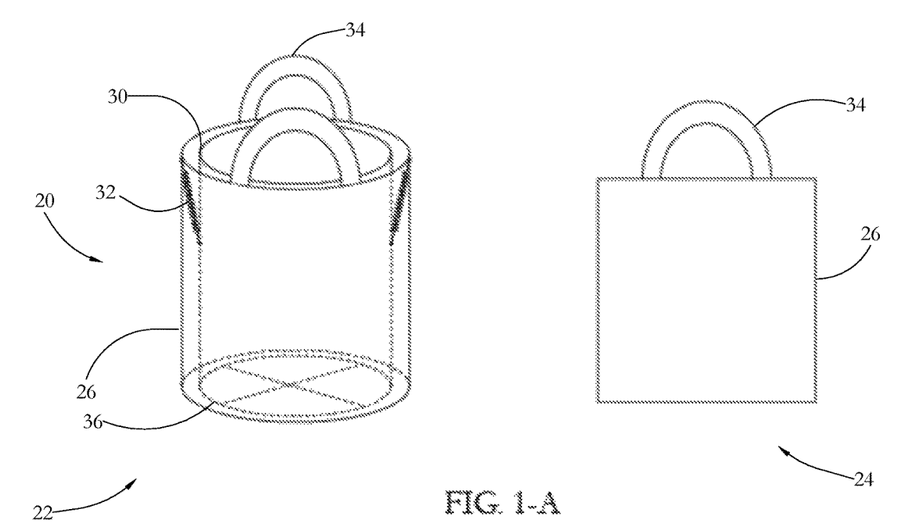

FIG. 1-A shows isometric (left panel) and side (right panel) views of an exemplary self-weighing expandable bag 20 including coil springs in a retracted (default, unloaded) configuration 22, while FIG. 1-B shows bag 20 in an expanded (loaded, weighed-down) configuration 22', according to some embodiments of the present invention. Bag 20 may be a shopping bag, purse, tote bag, or other handbag sized to be carried by hand or on a shoulder by a human. In an alternative embodiment, bag 20 may be a backpack. Exemplary bag 20 comprises a flexible receptacle 30 configured (sized and shaped) to contain a load for transportation. The load may comprise for example groceries, books, clothing, personal effects, and other items. Alternative embodiments may be configured to carry liquids (e.g., water, soft drinks, etc.). Bag 20 further comprises a flexible sleeve 26. Sleeve 26 laterally encloses receptacle 30 at least partially so that the receptacle slides vertically inside of and with respect to sleeve 26. Sliding herein denotes a relative motion (rise and/or descent) along a longitudinal direction of sleeve 26 and does not encompass, for instance, receptacle 30 bulging out laterally or otherwise deforming under the weight of the load. Sleeve 26 further comprises one or more handles 34. In some embodiments, handles 34 may be integrally formed with a body of sleeve 26 into a single monolithic unit. At least one handle 34 may be fashioned as a shoulder strap. Handles 34 may be attached to the body of sleeve 26 via stitching, riveting, gluing, thermal fusing, or other attachment method, and may be made from the same material(s) or different material(s) than the body of sleeve 26. An artisan will appreciate that unlike the illustrated embodiment, in a backpack configuration handles 34 may be attached asymmetrically so that one end of each handle is attached higher on the sleeve than the other end. Also, in a backpack configuration, handles 34 may be attached closer together instead of opposite each other as shown in FIGS. 1-A-B.

Bag 20 further comprises at least one spring 32 attached to sleeve 26 and configured to support receptacle 30. In the exemplary configuration of FIGS. 1-A-B, spring 32 comprises a plurality of metallic coils attached directly to receptacle 30 and sleeve 26. Each metallic coil is itself a spring, and collectively the metallic coils form a spring elastically connecting receptacle 30 to sleeve 26. Spring 32 controls a distance by which receptacle 30 descends within sleeve 26 under a weight of the load. The extent to which receptacle 30 protrudes beyond a bottom of the sleeve 26 is indicative of the weight of the load when the bag is held by the handle. In some embodiments, a bottom surface 36 of receptacle 30 may be generally flat (horizontal) when receptacle 30 is empty and/or loaded. In some embodiments, bottom surface 36 may be flexible and may become curved when receptacle 30 contains a load. In the illustrated embodiment, receptacle 30 and sleeve 26 have generally round, in particular circular or oval, matching transverse cross-sections.

Figure 2:
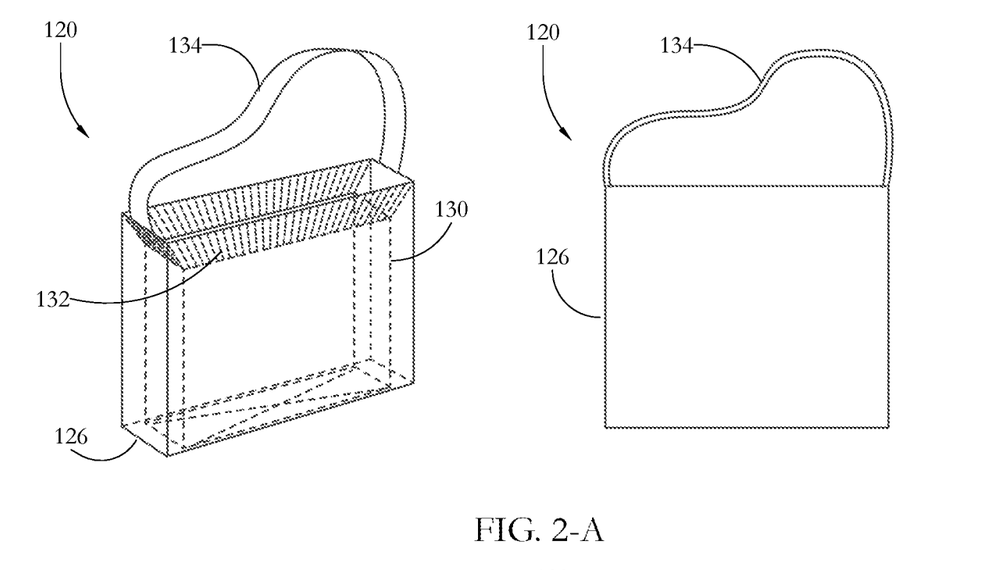

FIG. 2-A shows isometric and side views of another exemplary self-weighing expandable bag 120 including an elastic fabric spring in a retracted (default, unloaded) configuration, while FIG. 2-B shows bag 120 in an expanded (loaded, weighed-down) configuration, according to some embodiments of the present invention. An outer sleeve 126 is connected to an inner receptacle 130 through a spring 132. An exemplary single handle 134 is attached to opposite transverse sides of sleeve 126. In the illustrated embodiment, sleeve 126, receptacle 130 and spring 132 have generally angular, in particular rectangular, matching transverse cross-sections.

Exemplary spring 132 may be formed by a cylindrical, annular (ring-shaped), or prismatic band of elastic fabric, with the axis substantially aligned with the vertical/longitudinal direction of the bag. Spring 132 may stretch both radially and longitudinally, possibly with distinct specific stretch coefficients/elastic constants. In some embodiments, spring 132 may only stretch along the longitudinal direction. The elastic fabric forming spring 132 is attached to an upper rim of sleeve 126 along one (e.g., outer) edge of the fabric band, and attached to an upper rim of receptacle 130 along an opposite (e.g., inner) edge of the fabric band. Any suitable method of attachment may be used (e.g., stitching, gluing, thermal fusing, etc.). As receptacle 130 is weighted down by its contents, the elastic fabric of spring 132 stretches longitudinally and/or radially, allowing receptacle 130 to slide down within sleeve 126, as shown in FIG. 2-B. The maximum extent of spring 132 may be a multiple (e.g. 2-10×) of its resting/unstretched longitudinal extent.

Figure 3:
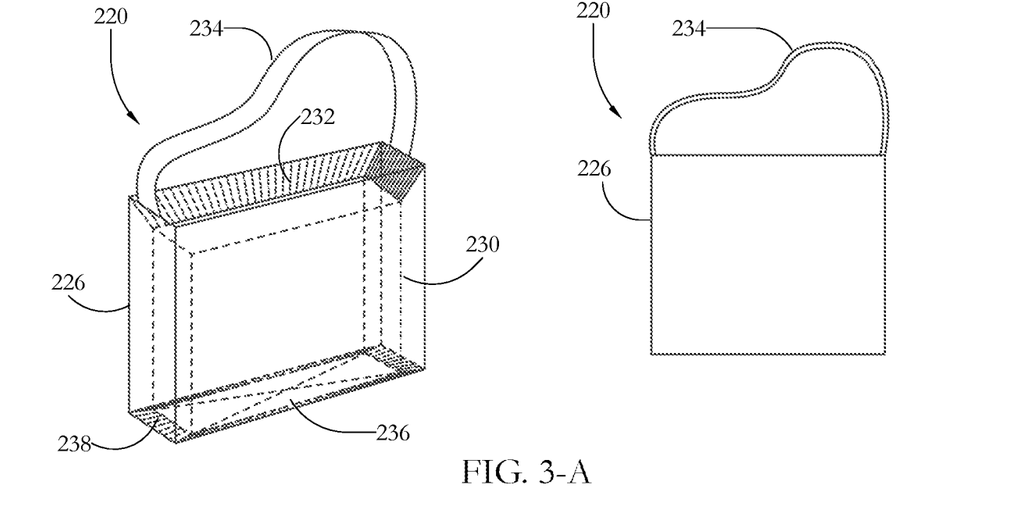

FIG. 3-A shows isometric and side views of a self-weighing expandable bag 220 including top and bottom elastic fabric springs in a retracted (default, unloaded) configuration, while FIG. 3-B shows bag 220 in an expanded (loaded, weighed-down) configuration according to some embodiments of the present invention. A spring coupling an outer sleeve 226 to an inner receptacle 230 has two longitudinally-separated components: a top annular band of elastic fabric 232 and a bottom annular band of elastic fabric 238. The part of the spring formed by band 238 extends underneath receptacle 230 to support receptacle 230 from below. The top annular band 232 is attached to an upper rim of sleeve 226 along an outer edge of band 232, and attached to an upper rim of receptacle 230 along an inner edge of band 232. The bottom annular band 238 is attached to a lower rim of sleeve 226 along an outer edge of band 238, and attached to an outer rim of a bottom plate 236 along an inner edge of band 238. A single handle 234 is attached to opposite transverse sides of sleeve 226. As receptacle 230 is weighted down by its contents, the elastic fabric of the spring formed by bands 232, 238 stretches, expanding the annular width(s) of the bands, and allowing receptacle 230 to slide down within sleeve 226, as shown in FIG. 3-B. In some embodiments, a bottom strip having a non-annular shape may be used instead of bottom band 238, for example a rectangular shape extending over the entire bottom surface of the sleeve (i.e. extending over the entire area covered by band 238 and plate 236 shown in FIGS. 3-A-B).

Figure 4:
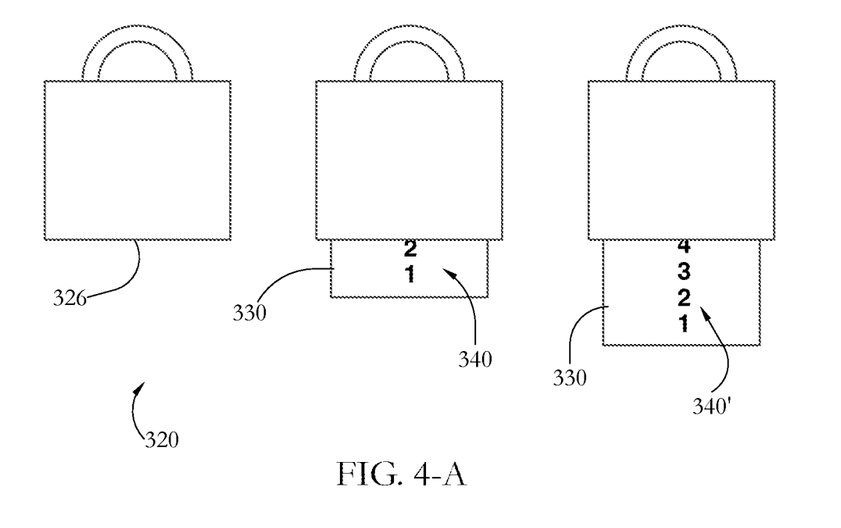

FIG. 4-A shows a side view of a bag 320 including exemplary numerical marking shown in configurations 340, 340' on the side of an inner receptacle 330, increasingly revealed as the extent of receptacle 330 outside of a sleeve 326 increases under the weight of receptacle contents, according to some embodiments of the present invention. As shown, the numerical markings may include consecutive integers (e.g. 1, 2, 3, 4, . . . ) or non-integers (e.g., 2.2, 2.5, or ¼, ½, etc.), positioned in a vertical sequence with the lowest number in the lowest position. In some embodiments, markings are positioned on receptacle 330 so that they are completely covered by sleeve 326 when the bag is empty, and they are revealed only when the bag is suspended by the handles and a load is placed inside of receptacle 330, or when the load exceeds a pre-determined weight.

FIG. 4-B shows a side view of a bag 420 including exemplary numerical markings shown in configurations 440, 440', 440" on the side of an inner receptacle 430 positioned within an outer sleeve 426, according to some embodiments of the present invention. An exemplary outer sleeve 426 has a transparent or semi-transparent surface having a reference marking 442 defined thereon. The alignment of the numeral markings on the side of inner receptacle 430 to the reference sleeve marking 442 changes under the weight of receptacle contents.

Figure 5:
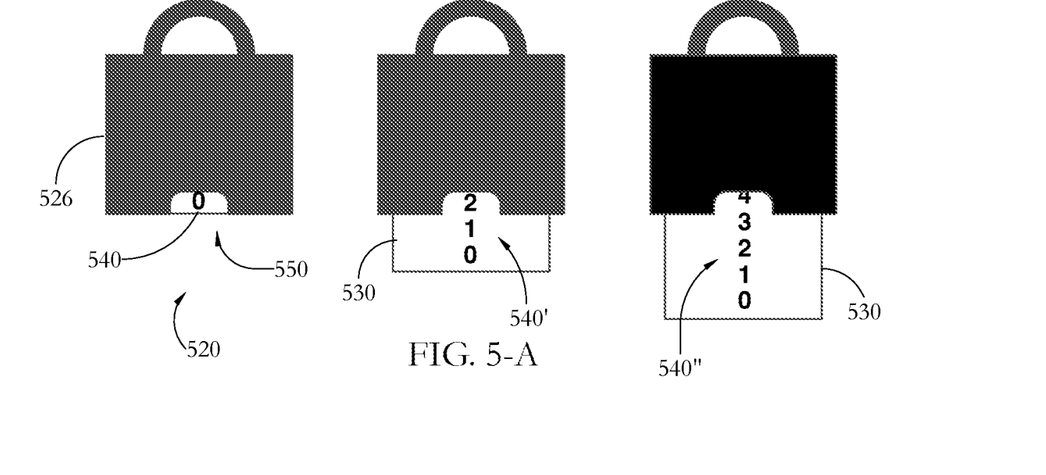

FIG. 5-A shows a side view of a bag 520 including an exemplary sleeve 526 having a display notch 550 defined along a bottom edge of sleeve 526 to reveal/highlight a selected marking along an inner receptacle 530 according to some embodiments of the present invention. The markings are shown in three consecutive configurations 540, 540', 540", and are increasingly exposed as the weight held by inner receptacle 530 increases.

FIG. 5-B shows a side view of a bag 620 including an exemplary sleeve 626 having a display side window (opening) 652 sized and positioned to reveal a selected marking 640 along an inner receptacle 630 according to some embodiments of the present invention. Sleeve 626 may include one or more additional markings/openings 652, which may serve a decorative purpose and/or to reduce the weight of sleeve 626.

Figure 6:
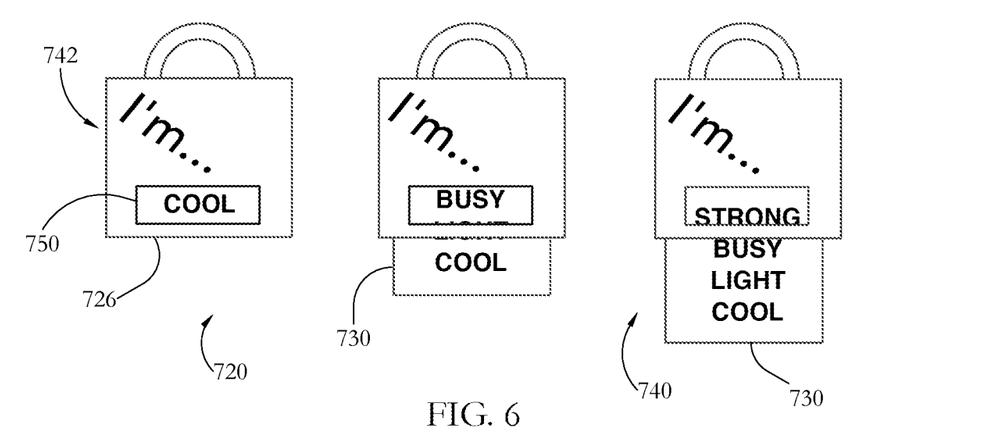
FIG. 6 shows a side view of a bag having multiple textual markings on the side of the inner receptacle, one of which is revealed within a side window defined in the sleeve, according to some embodiments of the present invention.

FIG. 6 shows a side view of a bag 720 having multiple textual markings 740 on the side of an inner receptacle 730 slidably disposed within an outer sleeve 726 according to some embodiments of the present invention. Sleeve 726 includes a complementary textual marking 742 disposed thereon, as well as a side window/opening 750 sized to expose one of the inner receptacle markings 740. A selected one of the receptacle markings 740 is revealed within window 750 at each of a plurality of heights of receptacle 730 relative to sleeve 726, forming a corresponding selected overall message together with complementary textual marking 742.

Figure 7:
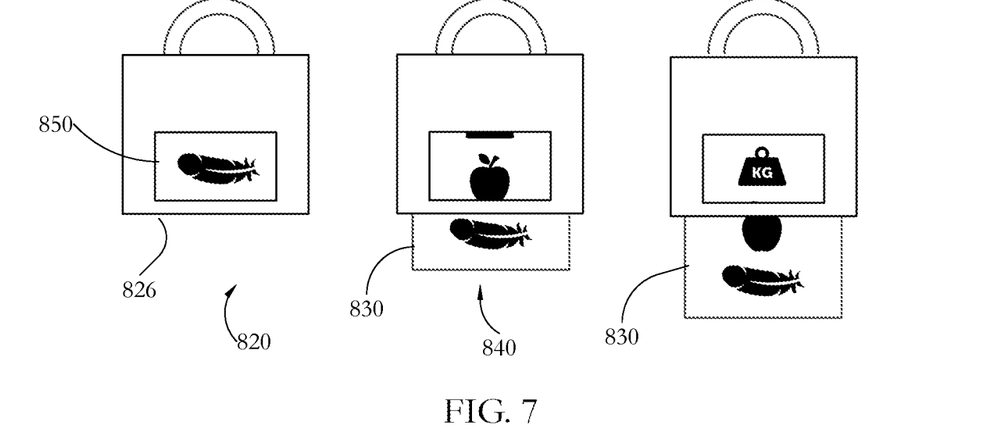
FIG. 7 shows a side view of a bag having multiple graphical object markings on the side of the inner receptacle, one of which is revealed within a side window defined in the sleeve, according to some embodiments of the present invention.

FIG. 7 shows a side view of a bag 820 having multiple graphical object markings 840 on the side of an inner receptacle 830 slidably disposed within an outer sleeve 826 according to some embodiments of the present invention. Sleeve 826 includes a side window/opening 850 sized to reveal a selected marking 840 at a time. Graphical object markings 840 display objects of increasing weights in a vertical sequence, with the lightest object placed in the lowest position: a feather, a fruit, and a weight in the illustrated example.

Other types of markings may be used to indicate an approximate weight of the load. In one example and with reference to FIG. 4, a set of non-numeric symbols may be used instead of the illustrated numbers. For instance, a pre-determined count of identical icons (e.g., dots, stars, emoticons, etc.) may be placed on the receptacle, for instance at equal vertical separations. A vertical distance between consecutive symbols may be chosen so exactly one symbol is revealed for each pre-determined weight increment (e.g., ½ pound). In such embodiments, a count of symbols visible on the receptacle when the bag is held by the handle(s) is indicative of an approximate weight of the bag's current load. In another example, the receptacle may have multiple parallel rows of identically shaped markings disposed thereon, wherein a size of the markings differs between rows. For instance, a bottom row may have the smallest markings, and the size of the markings may increase towards the rim of the receptacle. As the weight of the load increases, progressively larger markings are revealed, so a size of the markings visible on the receptacle when the bag is held by the handle(s) in an indicator of the weight of the bag's current load. In yet another example, the receptacle may have a heat map disposed thereon, for instance as a stack of horizontal stripes of different colors. As the weight of the load increases, stripes of different colors are revealed as the receptacle slides deeper within the sleeve (e.g., from blue on the bottom of the receptacle to green, to yellow, etc., higher up the side of the receptacle). In such embodiments, a color of a marking visible on the side of the receptacle when the bag is held by the handle(s) is indicative of a weight of the bag's current load.

In alternative embodiments, markings disposed on the receptacle as shown above may be used to indicate other properties of the load instead of weight. For instance, in a bag configured to carry liquids, a set of numerical markings as illustrated in FIGS. 4-A-B may indicate an approximate volume of a load of the receptacle, the volume expressed in some appropriate unit (e.g., liters, pints, gallons, cups, etc.).

In yet another exemplary embodiment of an expandable bag configured for grocery shopping, a set of numerical markings may indicate an approximate energy content (e.g., expressed in kilocalories) of a current load of the receptacle. In one such example, the receptacle may have multiple scales printed thereon, each scale comprising multiple numerical markings and corresponding to a distinct food type (e.g., milk, fruit, chocolate, meat, etc.). A position of each marking on the receptacle may be determined according to a specific energy content of the respective food type, so that for the same weight of the load, different numbers are revealed on each scale.

Figure 8:
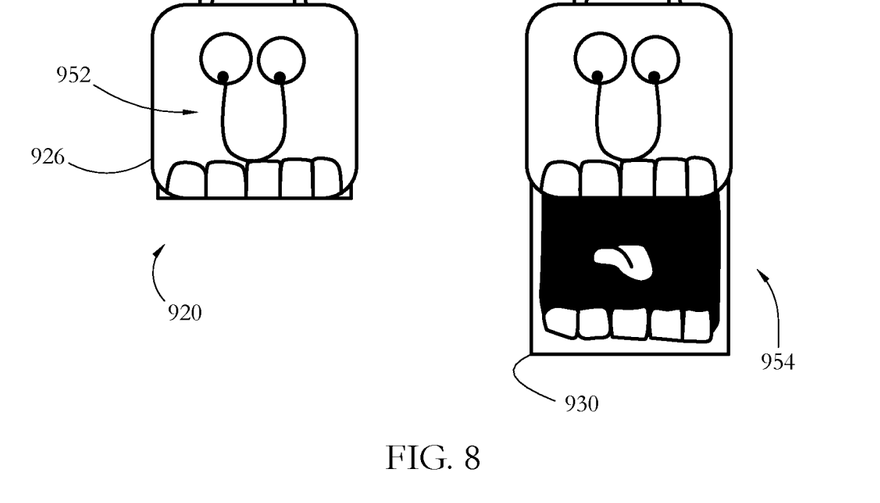
FIG. 8 shows a side view of a bag having complementary graphical markings on the side of the receptacle and the sleeve, wherein the complementary markings combine to form a unified object, according to some embodiments of the present invention.

FIG. 8 shows a side view of a bag 920 having complementary graphical markings 952, 954 on the side of a receptacle 930 and corresponding sleeve 926 according to some embodiments of the present invention. The complementary markings combine to form a unified object whose appearance depends on the vertical displacement of receptacle 930 within sleeve 926. In the illustrated embodiment, the unified object is a stylized human face, and sliding receptacle 930 downward under an increasing weight of a load graphically depicts increasingly opening a mouth of the human face.

Figure 9:
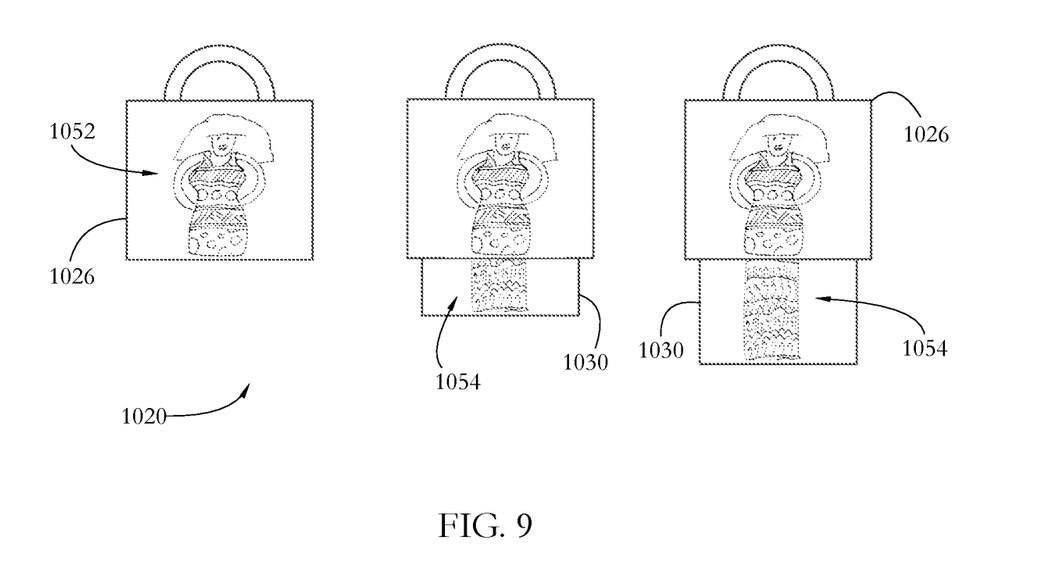
FIG. 9 shows a side view of another bag having complementary graphical markings on the side of the receptacle and the sleeve, wherein the complementary markings combine to form a unified object, according to some embodiments of the present invention.

FIG. 9 shows a side view of another bag 1020 having complementary graphical markings 1052, 1054 on the side of a receptacle 1030 and sleeve 1026 according to some embodiments of the present invention. Markings 1052, 1054 combine to form a unified object. In the illustrated embodiment, the unified object is a woman wearing a dress. Vertically displacing receptacle 1030 within sleeve 1026 under an increasing weight of a load reveals an increasing extent of the woman's dress.

Suitable materials and/or dimensions for the various parts of a bag as described above may be chosen according to the desired application/use (e.g. shopping bag, handbag, lunch-bag), desired size, and/or maximum weight of the carried load. Fabric, plastic, paper, natural leather, and metal may form suitable materials for one or more of the bag components described above. Although the above description indicated flexible materials, receptacle(s) 30, 130, and 230 and/or sleeve(s) 26, 126, and 226 may also be constructed out of semi-rigid or rigid materials (e.g., polycarbonate plastic, corrugated cardboard, plywood, sheet metal, etc.).

Exemplary spring(s) 32, 132, 232 may be constructed out of a variety of stretchable materials, for instance metal coils, plastic coils, natural or synthetic rubber bands, elastic braided cord, neoprene, stretchy yarn such as synthetic silk and polyether-polyurea copolymer yarn (e.g., Lycra®), various fabrics wherein the stretchable quality is a result of the yarn and/or the particular knitting technique, etc.

Suitable vertical dimensions for the sleeve and/or receptacle may be on the order of tens of cm, for example between 20 and 80 cm for each of the sleeve and receptacle. The minimum vertical overlap between sleeve and receptacle may be chosen to be on the order of cm to tens of cm, for example between 2 and 20 cm. A suitable spring constant for the sleeve-receptacle connection spring may be chosen according to a maximum anticipated weight of the load and corresponding desired vertical displacement according to the relationship F=kx, wherein F is the applied force (e.g., weight of load), x is the vertical displacement, and k is the spring constant.

Figure 10:
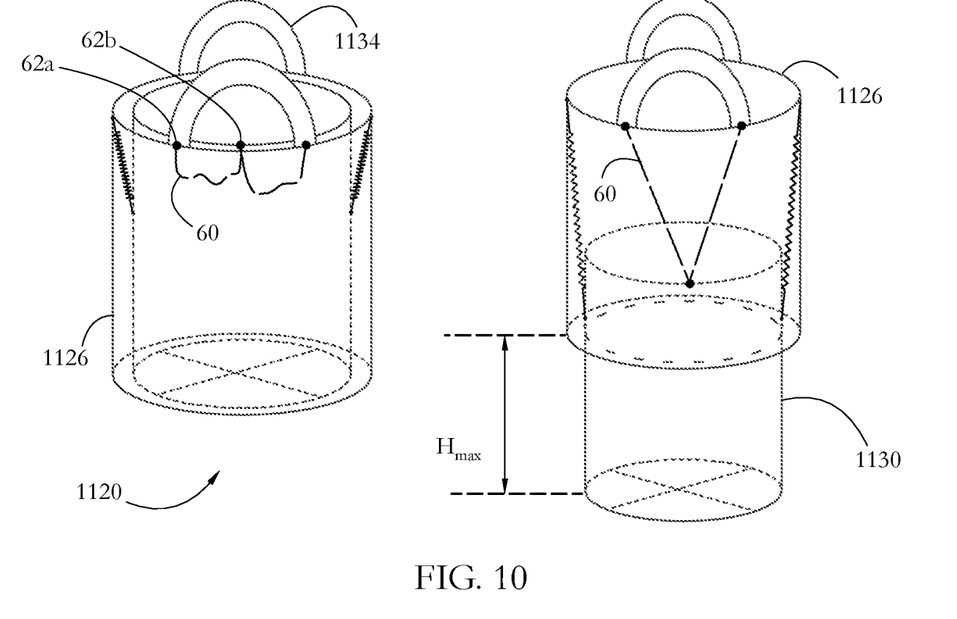
FIG. 10 shows an exemplary expandable bag including a vertical motion restraint according to some embodiments of the present invention.

In some embodiments, a fixed vertical motion restraint may be used to prevent further vertical motion of the receptacle relative to sleeve beyond a desired maximum, for example to prevent the receptacle from sliding outside of the sleeve in the presence of excess weight, or to prevent a spring connecting the receptacle to the sleeve from being overstretched and/or damaged. Such a fixed restraint may include one or more inelastic ropes or wires connecting the sleeve to the receptacle. FIG. 10 illustrates an exemplary expandable bag 1120 having a vertical motion restraint 60 according to some embodiments of the present invention. The illustrated restraint 60 comprises an inelastic wire attached with a set of rivets 62a to a sleeve 1126 and/or to a handle 1134, and with another set of rivets 62b to a mobile receptacle 1130. A length of restraint 60 may be chosen to prevent receptacle 1130 from descending within sleeve 1126 beyond a maximum distance $H_{max}$, or from protruding past the bottom of sleeve 1126 by more than the maximum distance $H_{max}$. In some embodiments, $H_{max}$ is correlated with a pre-determined weight of a load. For example, restraint 60 may prevent receptacle 1130 from descending beyond a position corresponding to a load of 5 lbs placed within receptacle 1130.

Another exemplary fixed vertical motion restraint may include one or more blocking members sized/positioned to prevent further motion of the receptacle relative to the sleeve by engaging complementary structures (e.g. one or more outer-facing protrusions attached to or forming part of the receptacle and sized to fit within vertical channels defined within the sleeve, or inner-facing protrusion on the sleeve sized to fit within vertical channels defined within the receptacle, for constraining a vertical extent of relative motion between the receptacle and sleeve).

Figure 11:
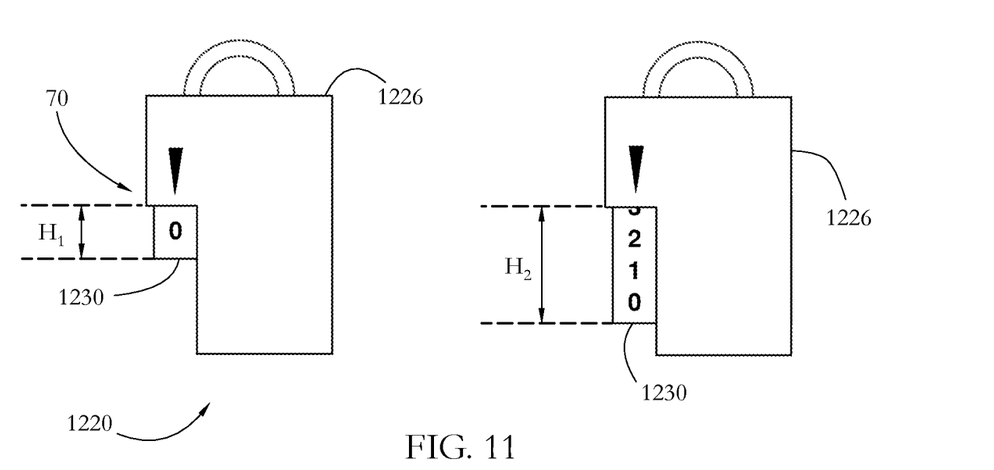
FIG. 11 shows side views of another self-weighing bag in a retracted and expanded state, wherein the sleeve protrudes laterally according to some embodiments of the present invention.

In another example illustrated in FIG. 11, an expandable bag 1220 includes a sleeve 1226 having a solid bottom which may be continuous with the rest of sleeve 1226 or constructed from another non-stretchable material (e.g., plywood, cardboard, etc.). In such embodiments, the bottom of the sleeve works like a fixed vertical motion restraint preventing a receptacle 1230 from descending further. A self-weighing feature may be implemented by having sleeve 1226 cut out to expose at least a part of receptacle 1230. In some embodiments as illustrated in FIG. 11, the cutout forms a lateral protrusion 70 in the sleeve. As a weight of a load increases, a spring connecting sleeve 1226 to receptacle 1230 may stretch as described above, controlling the distance by which receptacle 1230 descends within the confines of sleeve 1226. In some embodiments, the load's weight may be determined according to an amount by which receptacle 1230 extends downwards with respect to protrusion 70 of sleeve 1230. In the illustrated embodiment, in the left pane a distance $H_1$ indicates a small weight or an empty bag. In contrast, in the right pane, a larger distance $H_2$ indicates a larger weight or a loaded bag. Complementary graphical markings may be added as shown to indicate the approximate weight of the load.

Figure 12:
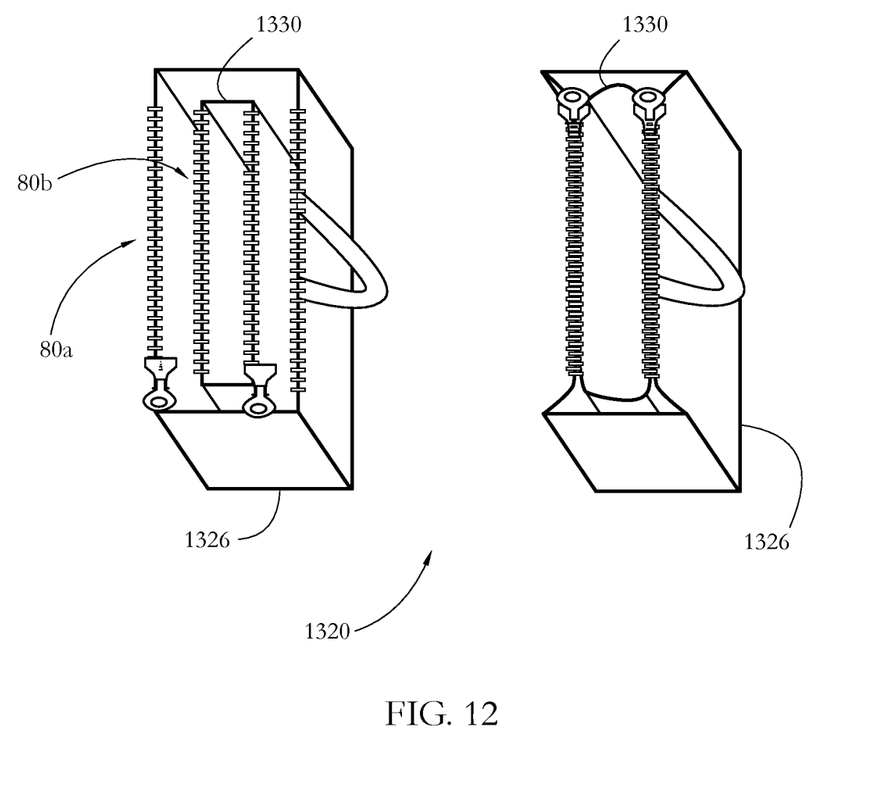
FIG. 12 shows an upper view of an exemplary expandable bag according to some embodiments of the present invention, the bag comprising a fastener usable to prevent the receptacle from sliding with respect to the sleeve.

FIG. 12 shows an upper view of another exemplary expandable bag 1320 having a fixed vertical motion restraint, optionally preventing a receptacle 1330 from descending within a sleeve 1326. Some embodiments comprise a two-part fastener, wherein a first part 70a is attached to sleeve 1326, while a second part 70b is attached to receptacle 1330. In the illustrated embodiment, the fastener comprises a zipper. A skilled artisan will appreciate that other two-part fasteners may be used instead, for instance buttons, snap fasteners, a clasp, a buckle, hook-and-eye fasteners, and hook-and-loop bands (e.g., Velcro®), among others. In the configuration illustrated in the left pane, parts 70a-b are not coupled to each other (e.g., unzipped), which allows receptacle 1330 to slide with respect to sleeve 1326. A user may optionally connect fastener parts 70a-b together to produce the configuration shown in the right pane of FIG. 12, wherein receptacle 1330 is prevented from moving longitudinally with respect to sleeve 1326.

It will be clear to one skilled in the art that the above embodiments may be altered in many ways without departing from the scope of the invention. Accordingly, the scope of the invention should be determined by the following claims and their legal equivalents.

What is claimed is:

1. A bag sized to be carried by a human, the bag comprising:
    a receptacle configured to contain a load for transportation;
    a sleeve comprising a handle, the sleeve at least partially laterally enclosing the receptacle so that the receptacle slides vertically inside of and with respect to the sleeve; and
    at least one spring attached to the sleeve and configured to support the receptacle, the spring controlling a distance by which the receptacle descends within the sleeve under a weight of the load, wherein an extent to which the receptacle protrudes beyond a bottom of the sleeve as the receptacle descends within the sleeve when the bag is held by the handle is visually indicative of the weight of the load.

2. The bag of claim 1, wherein the at least one spring comprises a plurality of coils connecting the receptacle to the sleeve.

3. The bag of claim 1, wherein the at least one spring is further attached to the receptacle.

4. The bag of claim 1, wherein the at least one spring comprises an annular elastic fabric attached to the sleeve along an outer edge of the fabric and attached to the receptacle along an inner edge of the fabric.

5. The bag of claim 4, wherein the annular elastic fabric is attached to the receptacle along an upper rim of the receptacle.

6. The bag of claim 1, wherein the at least one spring extends underneath the receptacle to support the receptacle from below.

7. The bag of claim 1, wherein a distance by which the receptacle slides vertically within the sleeve varies according to the weight of the load.

8. The bag of claim 1, wherein the receptacle comprises a marking positioned to be covered by the sleeve when the bag is held by the handle and the receptacle is empty, and to be revealed by the sleeve when the bag is held by the handle and the receptacle is not empty.

9. The bag of claim 8, wherein the marking comprises a rendering of a text indicative of the weight.

10. The bag of claim 9, wherein the text comprises a number.

11. The bag of claim 9, wherein the marking is positioned to be revealed by the sleeve only when the bag is suspended by the handle and the weight exceeds a predetermined value.

12. The bag of claim 9, wherein the sleeve comprises a window, and wherein the marking is positioned to be revealed through the window when the receptacle is not empty.

13. The bag of claim 9, wherein a proportion of the marking revealed by the sleeve when the bag is held by the handle is indicative of the weight.

14. The bag of claim 9, wherein the sleeve comprises another marking, the another marking positioned to align with the marking to form a composite marking indicative of the weight.

15. The bag of claim 1, wherein the receptacle comprises a plurality of markings, and wherein a count of markings of the plurality of markings revealed by the sleeve when the bag is held by the handle is indicative of the weight.

16. The bag of claim 1, wherein the receptacle comprises a plurality of markings, wherein at least two markings of the plurality of markings have distinct colors, and wherein a color of a marking of the plurality of markings revealed by the sleeve when the bag is held by the handle is indicative of the weight.

17. The bag of claim 1, wherein the sleeve is constructed from a material selected from a set consisting of a paper, a fabric, a natural leather, and an organic polymer.

18. The bag of claim 1, further comprising a vertical motion restraint attached to the sleeve and configured to prevent the receptacle from sliding longitudinally within the sleeve beyond a pre-determined maximal position.

19. The bag of claim 1, further comprising a two-part fastener, wherein a first part of the fastener is attached to the sleeve and second part of the fastener is attached to the receptacle, and wherein coupling the first part to the second part prevents the receptacle from sliding longitudinally with respect to the sleeve.

* * * * *